(12) United States Patent
Bleigh

(10) Patent No.: US 9,741,458 B2
(45) Date of Patent: Aug. 22, 2017

(54) MULTIMODAL DEBRIS TRAP

(71) Applicant: Performance Contracting, Inc., Lenexa, KS (US)

(72) Inventor: James M. Bleigh, Olathe, KS (US)

(73) Assignee: Performance Contracting, Inc., Lenexa, KS (US)

( * ) Notice: Subject to any disclaimer, the term of this patent is extended or adjusted under 35 U.S.C. 154(b) by 1172 days.

(21) Appl. No.: 14/031,185

(22) Filed: Sep. 19, 2013

(65) Prior Publication Data

US 2014/0064429 A1 Mar. 6, 2014

Related U.S. Application Data

(63) Continuation of application No. PCT/US2011/052440, filed on Sep. 21, 2011.
(Continued)

(51) Int. Cl.
*G21C 19/42* (2006.01)
*G21C 19/307* (2006.01)
(Continued)

(52) U.S. Cl.
CPC .......... *G21C 19/307* (2013.01); *B01D 29/114* (2013.01); *B01D 29/54* (2013.01); *G21C 15/18* (2013.01); *Y02E 30/40* (2013.01)

(58) Field of Classification Search
CPC G21C 15/18; G21C 15/182; G21C 2015/185; G21C 2015/187
See application file for complete search history.

(56) References Cited

U.S. PATENT DOCUMENTS 8,048,319 B2   11/2011   Smith et al.
8,054,932 B2   11/2011   Smith et al.
(Continued)

FOREIGN PATENT DOCUMENTS

JP   61-167896   7/1986   ............... G21C 9/00
JP   63-193093   8/1988   ............... G21D 1/00
(Continued)

OTHER PUBLICATIONS

Japanese Office Action dated Nov. 5, 2013 which issued for co-pending Japanese patent application No. 2013-511422.
(Continued)

*Primary Examiner* — Marshall O'Connor
(74) *Attorney, Agent, or Firm* — Womble Carlyle Sandridge & Rice; Louis T. Isaf

(57) ABSTRACT

In a debris trap that may be used in an Emergency Core Cooling System of a nuclear power plant, the filter media is arranged to define both filtration and bypass flowpaths that are in fluid communication with one another. At least initially, each of the filtration and bypass flowpaths are open, and the filtration and bypass flowpaths have relatively low and relatively high head loss, respectively. The debris trap is operative so that flow through the debris trap may passively, and typically gradually, transition from the filtration flowpaths to the bypass flowpath in response to the filter media collecting increasing amounts of debris. More specifically, initially substantially all of the flow may be through the filtration flowpaths, and thereafter the filtration flowpaths may become substantially obstructed so that substantially all of the flow is through the bypass flowpath.

17 Claims, 8 Drawing Sheets

Related U.S. Application Data

(60) Provisional application No. 61/477,699, filed on Apr. 21, 2011.

(51) Int. Cl.
  *B01D 29/11* (2006.01)
  *B01D 29/54* (2006.01)
  *G21C 15/18* (2006.01)

(56) References Cited

U.S. PATENT DOCUMENTS

| | | | |
|---|---|---|---|
| 2007/0084782 A1 | 4/2007 | Smith et al. | |
| 2012/0057668 A1* | 3/2012 | Uda | G21C 9/004 376/282 |

FOREIGN PATENT DOCUMENTS

| | | | | |
|---|---|---|---|---|
| JP | 10-62590 | 3/1998 | | G21C 9/00 |
| JP | 2010-271149 | 12/2010 | | G21C 9/00 |
| JP | 2010271149 A | * 12/2010 | | G21C 9/00 |
| KR | 10-2008-0059631 | 6/2005 | | G21C 15/18 |
| WO | WO 2010/134280 A1 | 11/2010 | | G21D 1/00 |
| WO | WO 2010/134288 A1 | 11/2010 | | G21D 1/00 |
| WO | WO 2010/134291 A1 | 11/2010 | | G21D 1/00 |

OTHER PUBLICATIONS

International Search Report & Written Opinion from co-pending International Application No. PCT/US2011/052440, dated Apr. 24, 2012.

\* cited by examiner

MULTIMODAL DEBRIS TRAP

CROSS-REFERENCE TO RELATED APPLICATIONS

This patent application is a continuation of international application no. PCT/US2011/052440, filed Sep. 21, 2011, which application claims the benefit of U.S. provisional patent application Ser. No. 61/477,699, filed on Apr. 21, 2011. The entire disclosure of the applications are incorporated herein by reference as if set forth in their entireties.

FIELD OF THE DISCLOSURE

This disclosure generally relates to separating debris from water and, more particularly, to filters or traps for collecting debris in the flow stream of an Emergency Core Cooling System of a nuclear power plant.

BACKGROUND OF THE DISCLOSURE

Emergency Core Cooling Systems (ECCS) of nuclear power plants typically include strainers (e.g., screens or other coarse filters) designed for preventing large debris generated by a Loss of Coolant Accident (LOCA) from reaching the ECCS pumps and/or components located downstream of the ECCS pumps. For some ECCS strainers, the holes in the strainer's surface material may range from 0.035 inch diameter holes up to 0.125 inch diameter holes, depending on plant-specific conditions. Although most debris may be stopped by an ECCS strainer, there may be "fine" debris that is small enough to flow through the ECCS strainer, even after a debris bed is formed on the surface of the ECCS strainer. If there is an excess of the fine debris and/or if the debris is of the wrong size and/or type, the debris could damage the ECCS pumps and/or increase the head loss of the system, which could cause insufficient flow of cooling water inside the reactor. This is not allowed to happen for safe operation of a nuclear power plant.

More specifically, a nuclear reactor is typically contained in a containment building, and if a LOCA in the form of a high energy pipe explosion were to occur, the generated debris would fall or be washed down to the basement of the containment building where a pool of water would form. Some of the fine debris in the pool of water may be in the form of fibrous insulation that falls off of piping and other components within the containment building during the LOCA. The pool supplies the ECCS pumps with the water needed to keep the reactor cool and to operate water sprays that condense the steam inside the containment's closed atmosphere. As the ECCS pumps receive water from the pool, water in the pool is drawn through the ECCS strainers. Some of the fine debris that is suspended in the water will flow through the ECCS strainers and reach components downstream of the ECCS strainers, such as valves, pumps, spray nozzles, the reactor vessel, etc. Damage to the downstream components and/or blockage of recirculation in the reactor vessel may occur if too much fine debris passes through the ECCS strainers.

In accordance with one aspect of this disclosure, there is a desire to collect a sufficient quantity of fine debris (e.g., fibrous debris) that would otherwise flow through the ECCS strainers, while at the same time limiting any head loss for the ECCS pumps.

SUMMARY OF THE DISCLOSURE

One aspect of this disclosure is the provision of a debris trap in which filter media is arranged to at least partially define both filtration and bypass flowpaths that are in fluid communication with one another. At least initially, each of the filtration and bypass flowpaths are open, and the filtration and bypass flowpaths have relatively low and relatively high head loss, respectively. In one example, the debris trap is operative so that flow through the debris trap may passively, and typically gradually, transition from the filtration flowpaths to the bypass flowpath in response to the filter media collecting increasing amounts of debris. More specifically, initially substantially all of the flow may be through the filtration flowpaths, and thereafter the filtration flowpaths may become substantially obstructed so that substantially all of the flow is through the bypass flowpath.

In accordance with one aspect of this disclosure, a plurality of filtration flowpaths are at least partially defined by the filtration media of the debris trap. For each filtration flowpath of a substantial number of the plurality of filtration flowpaths, the filtration flowpath extends through both first and second portions of the filtration media, so that the first and second portions of the filtration media are arranged in series in the filtration flowpath. The bypass flowpath extends between the first and second portions of the filtration media, and along each of the first and second portions of the filtration media. The debris trap is operative for automatically, passively decreasing flow through the plurality of filtration flowpaths and increasing flow through the bypass flowpath in response to the filtration media collecting increasing amounts of the debris.

In one aspect, the debris trap may include first and second filtration partitions that are in opposing face-to-face configuration with respect to one another, wherein the first filtration partition comprises the first portion of the filtration media, and the second filtration partition comprises the second portion of the filtration media. Additional filtration partitions may also be included.

In one example, one or more of the debris traps may be used in an ECCS of a nuclear power plant, so that the water in the ECCS would initially flow at least primarily through the filtration flowpaths, and the filter media may collect debris from the water. In response to the head loss in the filtration flowpaths increasing because of the debris accumulating on and/or in the filter media, an increased proportion of the water in the ECCS would flow through the bypass flowpath(s) in a manner that seeks to assure that there is not too much head loss for the ECCS pumps.

The debris trap may be positioned upstream of one or more strainers in the flowpath of the ECCS, and the debris trap may extend at least partially around the strainer(s). The debris trap may be in the form of, or otherwise include, a plurality of debris trap modules that extends at least partially around the strainer(s). Alternatively, the debris trap(s) may be in any other suitable position, or they may be put to any other suitable use.

One aspect of this disclosure is the provision of a method of separating debris from water in an ECCS flowpath of a nuclear power plant. In this regard, a debris trap may be positioned in the ECCS flowpath, so that the ECCS flowpath is simultaneously in fluid communication with both a bypass flowpath and a plurality of filtration flowpaths. The plurality of filtration flowpaths may be at least partially defined by filtration media of the debris trap. For each filtration flowpath of the plurality of filtration flowpaths, the filtration flowpath may extend from upstream of the filtration media to downstream of the filtration media. For each filtration flowpath of a substantial number of the plurality of filtration flowpaths, the filtration flowpath may extend through both first and second portions of the filtration media, so that the first and second portions of the filtration media are arranged in series in the filtration flowpath. The bypass flowpath may be at least partially defined by the filtration media. The bypass flowpath may extend between the first and second portions of the filtration media, and along each of the first and second portions of the filtration media. The water may be caused to flow along the ECCS flowpath and through the debris trap so that the plurality of filtration flowpaths initially have a lower head loss than the bypass flowpath, and the filtration media collects increasing amounts of the debris. In response to the filtration media collecting increasing amounts of the debris, flow through the plurality of filtration flowpaths is automatically, passively, gradually decreased, and flow through the bypass flowpath is automatically, passively, gradually increased.

In accordance with one aspect of this disclosure, since the flow through the debris trap may gradually transition from being primarily through the filtration flowpaths to being primarily through the bypass flowpath, the debris trap may be characterized as operating in numerous different modes and thereby providing multimodal debris trapping or filtration.

The foregoing presents a simplified summary of some aspects of this disclosure in order to provide a basic understanding. The foregoing summary is not an extensive summary of the disclosure and is not intended to identify key or critical elements of the invention or to delineate the scope of the invention. The purpose of the foregoing summary is to present some concepts of this disclosure in a simplified form as a prelude to the more detailed description that is presented later. Other aspects of this disclosure will become apparent from the following.

BRIEF DESCRIPTION OF THE DRAWINGS

Having described some aspects of this disclosure in general terms, reference will now be made to the accompanying drawings, which are schematic and are not necessarily drawn to scale, and wherein.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention.

Figure 1:
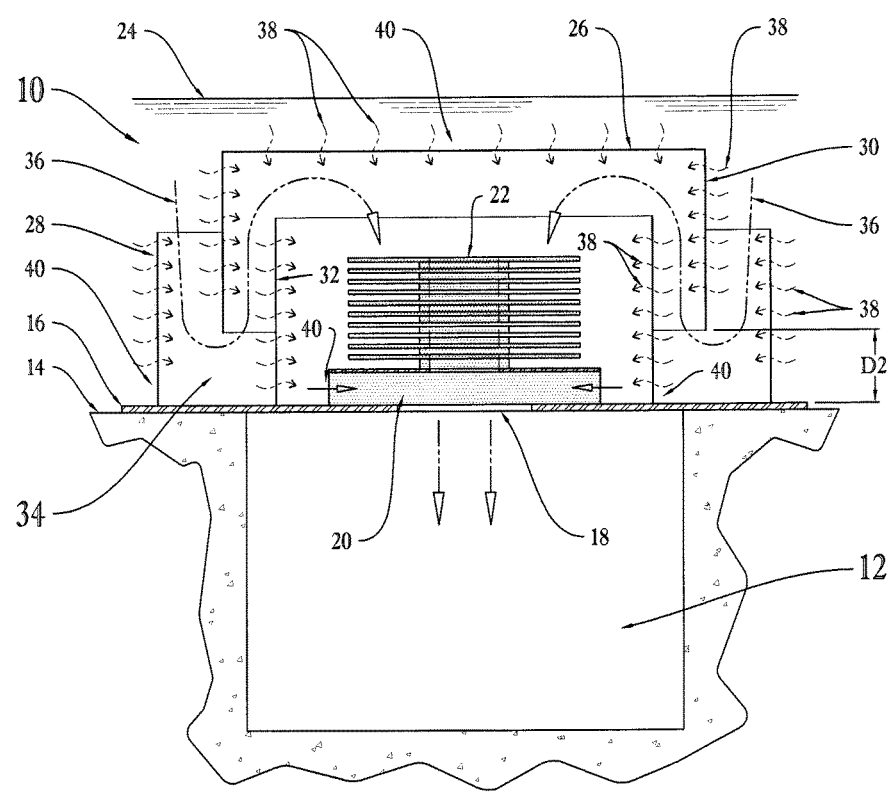
FIG. 1 is a front elevation view of a portion of an ECCS of a nuclear power plant, showing a system for separating debris from water in a flowpath of the ECCS, wherein a debris trap, sump top cover and basement floor are cross-sectioned along line 1-1 of FIG. 2, in accordance with a first embodiment of this disclosure.
Figure 2A:
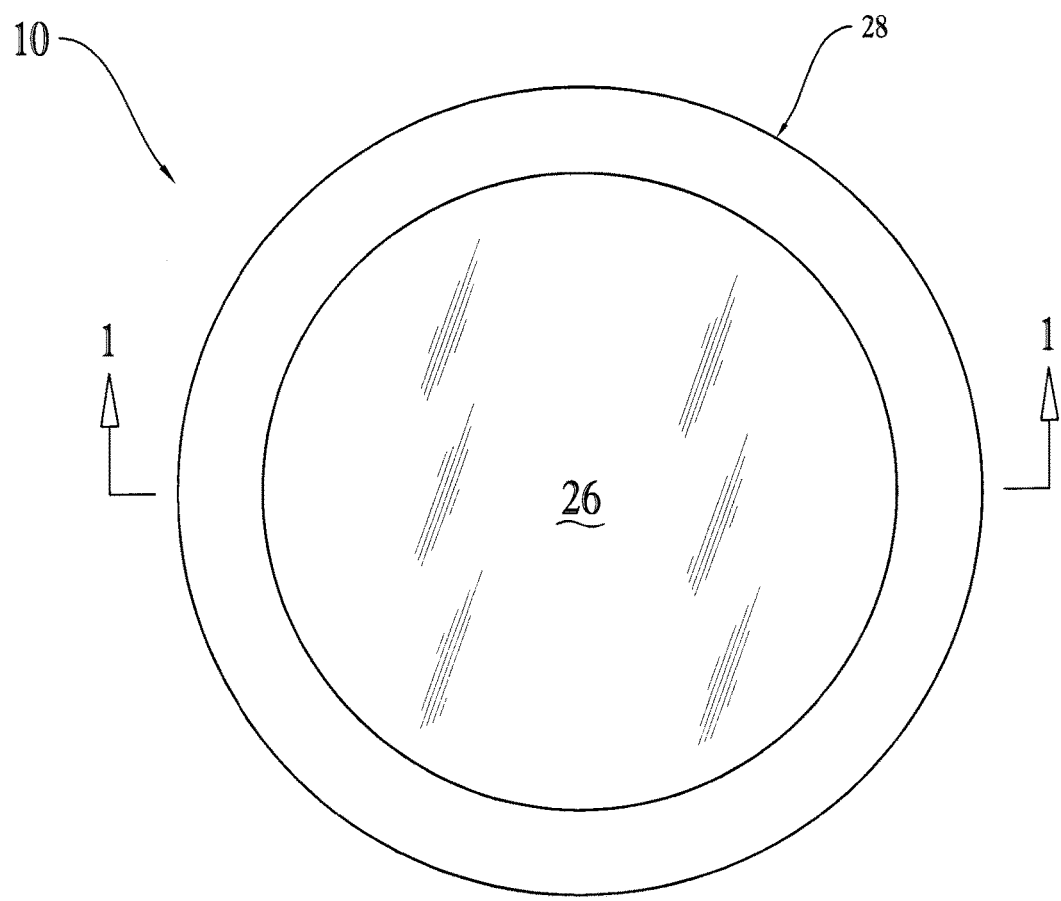
FIG. 2A is an isolated, top plan view of the debris trap of FIG. 1, according to one embodiment with round, cylindrical walls.
Figure 2B:
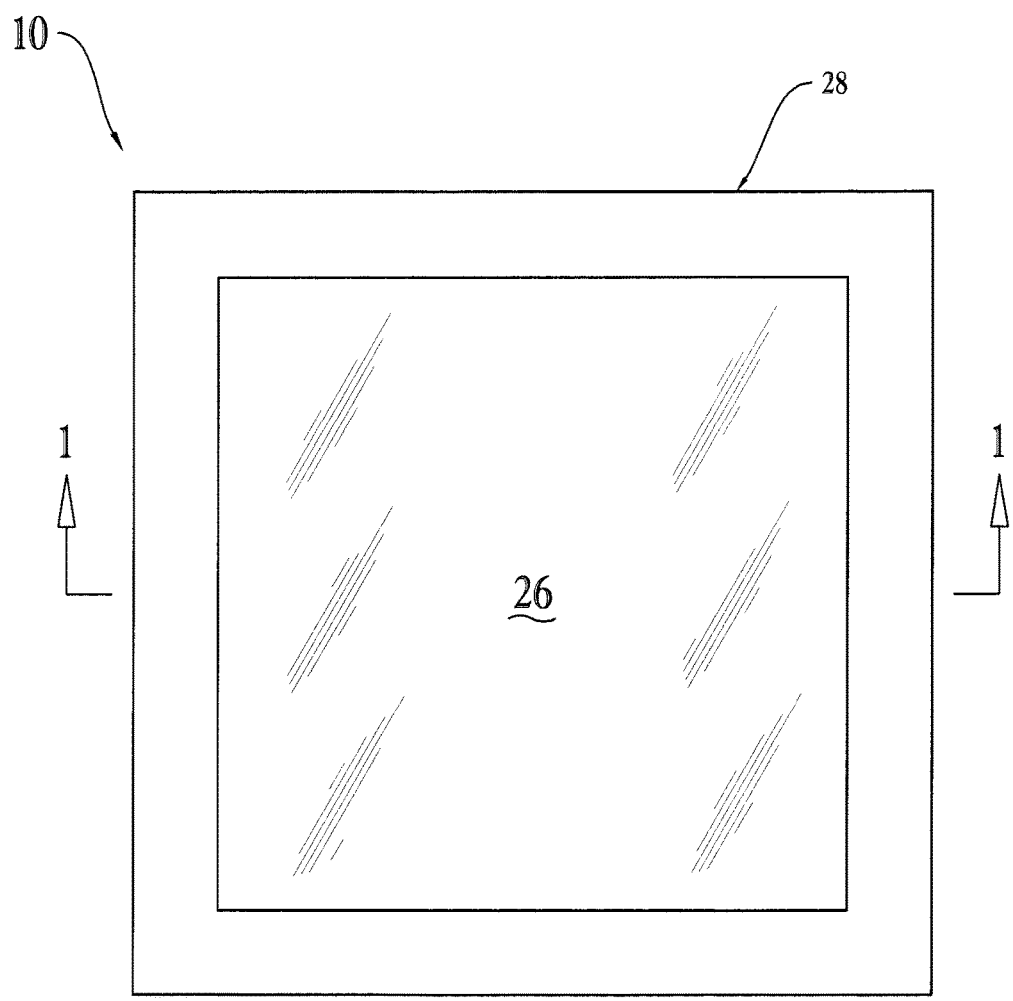
FIG. 2B is an isolated, top plan view of the debris trap of FIG. 1, according to a second embodiment with surrounding, elongated (e.g., tubular) rectangular walls.
Figure 3A:
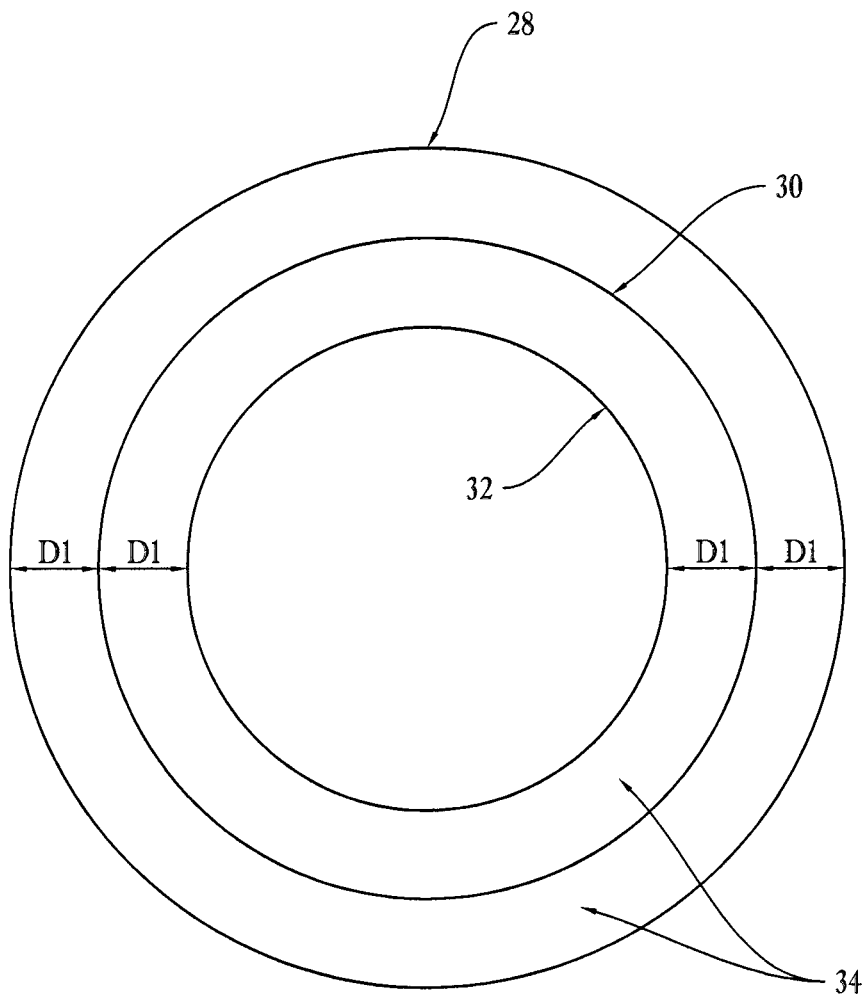
FIG. 3A is like FIG. 2A, except that a cover of the debris trap has been removed and is not shown.
Figure 3B:
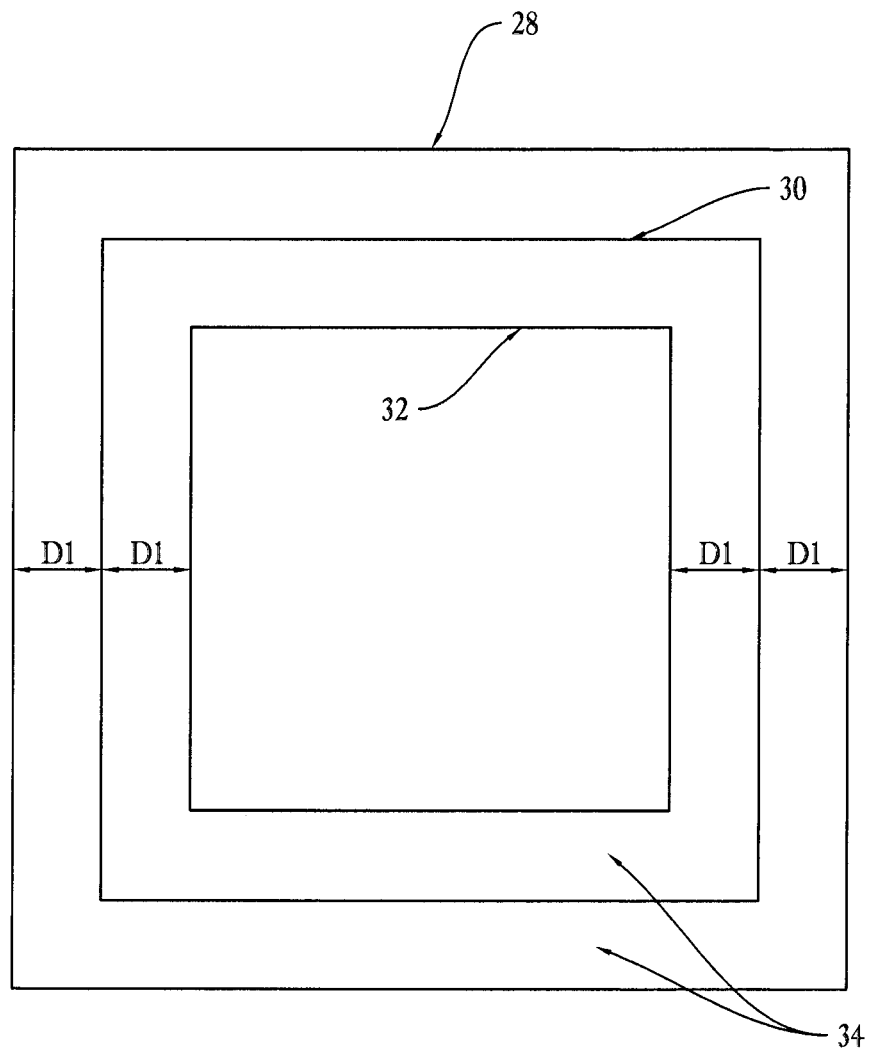
FIG. 3B is like FIG. 2B, except the cover of the debris trap has been removed and is not show.

FIGS. 1-3 schematically illustrate a debris trap 10, and in FIG. 1 the debris trap is shown in combination with conventional components of an ECCS of a nuclear power plant, in accordance with a first embodiment of this disclosure. In the following, a discussion of conventional ECCS features of the first embodiment will be followed by a discussion of the debris trap 10 of the first embodiment.

The ECCS includes a conventional pipe collector or sump chamber 12 defined in and/or below a conventional basement floor 14 of a containment building. Although the sump chamber 12 is shown in the form of a sump pit in FIGS. 1 and 4, the sump chamber may be replaced by a suction pipe or any other suitable connection to the ECCS pumps. A conventional, plate-like, sump top cover 16 is be mounted to the floor 14 and closes the top of the sump chamber 12, except that a central drain hole 18 extends through the sump cover and is in fluid communication with the sump chamber. A strainer 22, such as a conventional ECCS strainer, is mounted in a conventional manner to the sump top cover 16 and/or to any other suitable structure, so that the interior of the strainer is in fluid communication with the drain hole 18. Water may flow from the outside of the strainer 22, through the filtration media of the strainer, and then downwardly through the drain hole 18. According to some embodiments, when the pool of fluid is of sufficient depth to allow, the strainer 22 may be supported above the pool floor on a filter box 20 mounted to the sump top cover 16 so that the interior of the filter box is in fluid communication with the drain hole 18. As schematically illustrated by four arrows in FIGS. 1 and 4, water may flow from the outside of the filter box 20, through the filtration media of the filter box, and then downwardly through the drain hole 18. The filter box 20 may be omitted. As shown in FIG. 1, the strainer 22 may be a stacked-disk type of strainer, the filter box 20 may be characterized as being the bottom disk of the stacked-disk strainer, and a core, or the like, of the stacked-disk strainer may be in fluid communication with the drain hole 18. The strainer 22 may be any suitable conventional strainer, and examples of conventional strainers are disclosed in U.S. Pat. No. 5,759,399, U.S. Pat. No. 5,935,439, U.S. Pat. No. 6,491,818 and US 2088/0223779. The strainer 22 may be more generally referred to as a filter, and it may be more specifically referred to as a course filter, as discussed in greater detail below. The drain hole 18, filter box 20 and strainer 22 may be concentrically arranged with respect to another, although other arrangements are also within the scope of this disclosure. Multiple strainers 22 may be placed on top of one filter box 20.

The outer surface of the strainer 22 may be defined by perforated metal sheets, wire screens, or any other suitable structure. The holes in the structures defining the outer surface of the strainer 22 may range from 0.035 inch diameter holes up to 0.125 inch diameter holes, depending on the plant-specific conditions. The strainer 22 may be any suitable conventional strainer or strainer array, or the like. As one example, the strainer 22 may be a Sure-Flow® Brand strainer available from Performance Contracting, Inc. of Lenexa, Kans. When present, the filter box 20 may be in the form of a fine filter, such that its outer/upstream surface is for capturing debris 40 that is finer (i.e., smaller) than the debris captured by the more course filter/strainer 22. The filter box 20 includes an unobstructed opening or passage through which the strainer 22 out-flow communicates freely with the sump.

As mentioned above, it is conventional, in the event of a LOCA, for debris to fall or be washed down to the basement floor 14 of a reactor containment building, where a pool 24 of water forms. The filter box 20 and/or strainer 22 may be characterized as being a filter assembly through which water from the pool 24 is drawn in response to operation of one or more ECCS pumps (not shown) that are downstream from and take suction from the sump chamber 12. As discussed above, although most debris may be stopped by the strainer 22, there may be "fine" debris that is small enough to flow through the strainer 22, even after a debris bed is formed on the surface of the strainer.

In accordance with the first embodiment of this disclosure, the debris trap 10 is mounted upstream of both the strainer 22 and the optional filter box 20, and the debris trap is operative in a manner that seeks to both: collect any fine debris in the water that flows toward the strainer 22, and assure that there is not too much head loss for the ECCS pump(s), as will be discussed in greater detail below. In the following, a discussion of the structure of the debris trap 10 is followed by a discussion of how the debris trap may operate, all in accordance with the first embodiment. Thereafter, examples of variations to the first embodiment are discussed.

The debris trap 10 includes a substantially horizontally extending, upper filtration partition 26; and outer, intermediate and inner filtration partitions 28, 30, 32 that are each upright and tubular. More specifically, the upper filtration partition 26 is substantially in the form of a planar disk, and the outer, intermediate and inner filtration partitions 28, 30, 32 are substantially in the form of concentric cylinders, although different configurations are within the scope of this disclosure, as discussed below.

Generally described and as will be discussed in greater detail below in accordance with one mode of operation, each of the filtration partitions 26, 28, 30, 32 is for separating debris from the water that is in the pool 24 and flowing toward the strainer 22, including for separating and capturing debris that is finer (i.e., smaller), and preferably, but not necessarily, substantially finer, than the debris that can be captured by the strainer 22. Each filtration partition 26, 28, 30, 32 may include or be in the form of any suitable filtration media for this purpose. That is, the filtration partitions 26, 28, 30, 32 may be broadly characterized as being filtration media. More specifically, each filtration partition 26, 28, 30, 32 may include or be in the form of perforated sheet metal, wire screens, mesh, steel wool, filtration grills, filtration panels and/or any other suitable filter media. For example, the holes in the structures defining the outer surfaces of the filtration partitions 26, 28, 30, 32 may have diameters of less than about 0.125 inches, or less than about 0.035 inches, depending on the plant-specific conditions.

The filtration media of the filtration partitions 26, 28, 30, 32 may be self-supporting and/or each of the filtration partitions may include a frame, framework, lattice and/or any other suitable structures for supporting and/or reinforcing the filtration partition. For example and in accordance with the first embodiment, the filtration partitions 26, 28, 30, 32 would be adapted so that they would withstand a LOCA in the form of a high energy pipe explosion, and thereafter function as intended. In some situations the filtration partitions 26, 28, 30, 32 may be adapted so as to intrinsically have the needed strength and/or the filtration partitions may be associated with other reinforcing or protective structures so that the filtration partitions in combination with the other structures have sufficient strength. When present, the filter box 20 may be constructed of the same or similar materials as the filtration partitions 26, 28, 30, 32.

In accordance with the first embodiment, the debris trap 10 is upstream of the filter box 20 and strainer 22, although in some alternate embodiments, the positions may be reversed, and, in still other alternate embodiments (for example, where screening out large debris is not required), the debris trap 10 may be utilized independently of the filter box 20 and/or strainer 22. More specifically, the outer, intermediate and inner filtration partitions 28, 30, 32 extend around the filter box 20 and strainer 22; and the upper filtration partition 26 is positioned above the drain hole 18, filter box 20, strainer 22, intermediate filtration partition 30 and inner filtration partition 32. Even more specifically, the filtration partitions 26, 28, 30, 32 may be concentrically arranged with respect to the drain hole 18, filter box 20 and strainer 22.

The tubular outer and inner filtration partitions 28, 32 are substantially downwardly closed by virtue of the lower ends or edges thereof being in substantially close proximity to the sump cover 16 or floor 14. More specifically, the lower ends or edges of the outer and inner filtration partitions 28, 32 may be mounted to or otherwise abutting the sump cover 16 or floor 14. The outer and inner filtration partitions 28, 32 are spaced apart from one another so that a downwardly closed (e.g., substantially closed) and upwardly open tubular cavity 34 is defined between the outer and inner filtration partitions. Referring to FIG. 3, the tubular cavity 34 may be cylindrical.

The intermediate filtration partition 30 is axially offset/only partially overlapping with respect to the outer and inner filtration partitions 28, 32. More specifically, the intermediate filtration partition 30 extends into the tubular cavity 34 that is between the outer and inner filtration partitions 28, 32. The tubular intermediate filtration partition 30 is downwardly open by virtue of its lower end or edge being spaced apart from, and positioned above, the sump cover 16 or floor 14. The tubular intermediate filtration partition 30 protrudes outwardly, upwardly from the tubular cavity 34. The upper end of the tubular intermediate filtration partition 30 is obstructed by the upper filtration partition 26. For example, the periphery of the upper filtration partition 26 may be fixedly connected to, or otherwise abutting, the annular upper end or edge of the intermediate filtration partition 30.

Referring to FIG. 3, each of the outer, intermediate and inner filtration partitions 28, 30, 32 are spaced apart from one another so that a horizontal, radial distance D1 is defined between adjacent ones of the outer, intermediate and inner filtration partitions. In the first embodiment, each of the radial distances D1 may be about four inches, and the inner filtration partition 32 may be similarly spaced apart from the filter box 20 and strainer 22 by about four inches. Referring to FIG. 1, the lower end or edge of the intermediate filtration partition 30 is spaced apart from the sump cover 16 or floor 14 so that an upright, or more specifically vertical, distance D2 is defined therebetween. In the first embodiment, the distance D2 may be about eight inches. Different dimensions are within the scope of this disclosure. For example, the dimensions may depend on the plant-specific conditions.

The filtration partitions 26, 28, 30, 32 may be mounted in any suitable manner, such as by using structural members, fasteners, welding and/or any other suitable features or techniques. For example, structural members (not shown) may be mounted to and extend downwardly from the lower end or edge of the intermediate filtration partition 30, and these structural members may extend to the sump cover 16 and/or floor 14, for supporting the intermediate filtration partition 30. Notwithstanding, a majority, such as a vast majority, of the space between the lower end or edge of the intermediate filtration partition 30 and the adjacent sump cover 16 and/or floor 14 is open, such as by not being obstructed by any of the supporting structural members, so that a midstream segment of a bypass flowpath 36 extends around the lower end or edge of the intermediate filtration partition.

In accordance with the first embodiment, the bypass flowpath 36 is an open flowpath that is intended to always remain open. The bypass flowpath 36 is schematically illustrated in each of FIGS. 1 and 4 by a pair of arrows with shanks formed with alternating long and short dashes. As shown, the bypass flowpath 36 extends around, or at least past, the upper ends or edges of the outer and inner filtration partitions 28, 32; along each of the outer, intermediate and inner filtration partitions 28, 30, 32; and around the lower end or edge of the intermediate filtration partition 30.

At least a portion of an upstream segment of the bypass flowpath 36 may be characterized as consisting essentially of a cylindrical area that is defined between an upper cylindrical portion of the inner surface of the outer filtration partition 28 and a lower cylindrical portion of the outer surface of the intermediate filtration partition 30 that are in opposing face-to-face relation with one another. At least a portion of a midstream segment of the bypass flowpath 36 may be characterized as consisting essentially of a cylindrical area that is defined between a lower cylindrical portion of the inner surface of the outer filtration 28 partition and a lower cylindrical portion of the outer surface of the inner filtration partition 32 that are in opposing face-to-face relation with one another. In addition, the midstream segment of the bypass flowpath 36 may be characterized as being partially defined by the sump cover 16 or floor 14. At least a portion of a downstream segment of the bypass flowpath 36 may be characterized as consisting essentially of a cylindrical area that is defined between a lower cylindrical portion of the inner surface of the intermediate filtration partition 30 and an upper cylindrical portion of the outer surface of the inner filtration partition 32 that are in opposing face-to-face relation with one another. In addition, the downstream segment of the bypass flowpath 36 may be characterized as being partially defined by the upper filtration partition 26.

In addition to at least partially defining the bypass flowpath 36, each of the filtration partitions 26, 28, 30, 32 may be characterized as at least partially defining filtration flowpaths 38 of the debris trap 10. Segments of the filtration flowpaths 38 are schematically illustrated in each of FIGS. 1 and 4 by numerous relatively small arrows that each have a curved shank, and the segments of the filtration flowpaths respectively extend through the holes in the filtration partitions 26, 28, 30, 32. For example, the upper filtration partition 26 defines generally axial filtration flowpaths 38 that extend generally axially downwardly through the upward filtration partition. In contrast, the outer, intermediate and inner filtration partitions 28, 30, 32 each define at least segments of generally radial filtration flowpaths 38 that extend generally radially inwardly through one or more of the outer, intermediate and inner filtration partitions.

As more specific examples regarding flow through the debris trap 10: each of the generally radial filtration flowpaths 38 that is located at an elevation above the upper ends or edges of the outer and inner filtration partitions 28, 32 may extend solely through the intermediate filtration partition 30; each of the generally radial filtration flowpaths 38 that is located at an elevation below the lower end or edge of the intermediate filtration partition 30 may extend through both of the outer and inner filtration partitions 28, 32; and each of the generally radial filtration flowpaths 38 that is located at elevations between the upper ends or edges of the outer and inner filtration partitions 28, 32 and the lower end or edge of the intermediate filtration partition 30 may extend through each of the outer, intermediate and inner filtration partitions 28, 30, 32. Further regarding flow through the debris trap 10, each filtration flowpath 38 extending through only one of the filtration partitions 26, 28, 30, 32 may be characterized as providing a single stage of filtration, each filtration flowpath 38 extending through two of the filtration partitions may be characterized as providing two stages of filtration, and each filtration flowpath 38 extending through three of the filtration partitions may be characterized as providing three stages of filtration. A greater or lesser number of filtration partitions and stages of filtration may be provided, as discussed in greater detail below.

In accordance with the first embodiment, the debris trap 10 is configured so that, at least initially, each of the bypass and filtration flowpaths 36, 38 is open, and, as compared to one another, the bypass and filtration flowpaths have relatively high and low head loss, respectively. For example the sizes of the holes in the filtration partitions 26, 28, 30, 32 and the spacing between the filtration partitions and other components of the ECCS are discussed above. The head loss is also a function of the volume of the flow through the debris trap 10. The differences between head loss in the bypass and filtration flowpaths 36, 38, and the manner of providing the differences, may vary depending on the plant-specific conditions.

An example of aspects of operating the debris trap 10 after a LOCA will be described in the following, with reference to FIG. 1 and in accordance with the first embodiment of this disclosure. After a sufficient pool 24 of water forms, one or more operating ECCS pumps receive water from the sump chamber 12 so that water flows through the debris trap 10 toward the filter box 20 and strainer 22. Typically, the filtration partitions 26, 28, 30, 32 are initially substantially clear of debris, such that the bypass and filtration flowpaths 36, 38 have relatively high and relatively low head loss, respectively. As a result, a majority or substantially all of the flow through the debris trap 10 is by way of the filtration flowpaths 38.

As a result of the flow of water through the filtration flowpaths 38, any debris 40 that is in the water and larger than a predetermined size is respectively collected by the outer/upstream surfaces of the filtration partitions 26, 28, 30, 32. The collected debris 40 is schematically illustrated by stippling in FIG. 1. As the filtration partitions 26, 28, 30, 32 continue to collect debris 40, namely more and more relatively small debris over time, the head loss through the filtration flowpaths 38 increases. As a result and over time, the volume of flow through the filtration flowpaths 38 decreases, and the volume of flow through the bypass flowpath 36 increases. This transition of flow from the filtration flowpaths 38 to the bypass flowpath 36 typically occurs gradually over time in response to the filtration partitions 26, 28, 30, 32 accumulating more and more debris 40 over time. In accordance with the first embodiment, the filtration partitions 26, 28, 30, 32 collect the debris in a manner that reduces the quantity of debris that bypasses the ECCS strainer 22.

The outer, intermediate and inner filtration partitions 28, 30, 32 are spaced apart from one another and adjacent components of the ECCS in a manner that seeks to ensure that the bypass flowpath 36 remains open continually. In contrast, the accumulating debris collected by the filtration partitions 26, 28, 30, 32 continues to reduce the volume of flow through the filtration flowpaths 38 by increasingly obstructing the filtration flowpaths and, thereby, increasing the head loss through the filtration flowpaths. In response to the head loss in the filtration flowpaths 38 increasing because of the debris 40 accumulating on and/or in the filter media of the filtration partitions, the proportion of the water in the ECCS flowing through the bypass flowpath 36 increases in a manner that seeks to assure that there is not too much head loss for the ECCS pumps.

In accordance with one aspect of this disclosure, the typically gradual transition of flow from the filtration flowpaths 38 to the bypass flowpath 36 may be characterized as being passive since, for example, it occurs automatically without requiring that any conventional valves, dampers and/or the like be operated. In accordance with one aspect of this disclosure and for at least a substantial period of time, the bypass and filtration flowpaths 36, 38 remain in fluid communication with one another in a manner that facilitates the gradual, passive transition of flow from the filtration flowpaths to the bypass flowpath. On the other hand, in some scenarios the filtration partitions 26, 28, 30, 32 may each eventually become fully clogged, obstructed or closed by the debris 40 in a manner such that the filtration flowpaths 38 may be characterized as being nonexistent, such that the bypass flowpath 36 eventually is not in fluid communication with the filtration flowpaths, since they are nonexistent.

In accordance with one aspect of this disclosure, since the flow through the debris trap 10 may gradually transition from being primarily through the filtration flowpaths 38 to being primarily through the bypass flowpath 36, the debris trap may be characterized as operating in numerous different modes and thereby providing multimodal debris trapping or filtration. For example, the capturing of the debris 40 by the filtration partitions 26, 28, 30, 32 may be staggered, such that the rate at which the inner filtration partition 32 accumulates debris may initially be relatively low as compared to the other filtration partitions 26, 28, 30. The rate at which the inner filtration partition 32 accumulates debris may increase after the other filtration partitions 26, 28, 30 become sufficiently obstructed so that water flows through the upstream and intermediate segments of the bypass flowpath 36, and at least some of the water flowing through the upstream and intermediate segments of the bypass flowpath flows through the inner filtration partition rather than continuing through the downstream segment of the bypass flowpath. Whereas only a few of the modes of flow through the debris trap 10 have been described very specifically in the foregoing, those of ordinary skill in the art will understand that there may be numerous different modes and, thereby, multimodal debris trapping or filtration. On the other hand, in some scenarios the debris trap 10 may not be required to accumulate very much fine debris 40, such that there may not be such a gradual transition of flow from the filtration flowpaths 38 to the bypass flowpath 36.

At least partially reiterating from above, the debris trap 10 is operative to passively collect and hold a finite amount of the debris 40. Water is drawn through the filtration partitions 26, 28, 30, 32 of the debris trap 10 in response to operation of one or more of the ECCS pumps which are downstream of the ECCS strainer 22. Initially, the water flows toward the debris trap 10 from all directions, and the water meets very low or no flow resistance through the filtration flowpaths 38 while they are free of the debris 40. As the filtration partitions 26, 28, 30, 32 trap more and more suspended debris 40, the flow resistance increases through the filtration flowpaths 38, depending upon the flow rates and quantities and types of debris trapped in the filtration partitions. As flow resistance through the filtration flowpaths 38 increases, the resistance to flow through the filtration partitions 26, 28, 30, 32 will be higher than the flow resistance required to force the water through the open bypass flowpath 36. In accordance with the first embodiment, the debris trap 10 seeks to avoid causing a high resistance (head loss) in the flow to, or block flow to, the ECCS strainer 22 by leaving open the bypass flowpath 36. In accordance with one aspect of this disclosure, the debris trap 10 is not necessarily intended to stop all debris 40 from reaching the ECCS strainer 22; rather, the debris trap seeks to capture enough of the debris to attain an acceptable overall performance of the ECCS.

The filter media of the filtration partitions 26, 28, 30, 32 may vary depending upon design conditions and filtering efficiencies. For example, the surfaces of the filtration partitions 26, 28, 30, 32 (e.g., the surfaces of the filtration media of the filtration partitions) may vary from relatively flat surfaces of a single material to complex corrugations, brushes, composite materials and/or panels. The distance between opposing filtration partitions 28, 30, 32 is a variable that may be used to control how much flow resistance is acceptable as a maximum in the event that flow through the filtration partitions 28, 30, 32 becomes totally blocked. That is, the debris 40 is captured by opposing filter media (i.e., by opposite ones of the filtration partitions 28, 30, 32) due to flow therethrough until such time the flow resistance forces the water to flow along the bypass flowpath 36 between the opposing filter media rather than through the opposing filter media. In accordance with one aspect of this disclosure, the bypass flowpath 36 is an alternate, unfiltered, free flowpath that is used when the head loss becomes too great for flow through the filtration flowpaths 38.

Simultaneously with the operation of the debris trap 10 (i.e., flow through the filtration flowpaths 38 and/or flow through the bypass flowpath 36), the filter box 20 and strainer 22 function to collect debris that is of predetermined size(s) and passes through the debris trap, such as by way of the bypass flowpath 36. Arrows shown extending into the filter box, and downwardly from the drain hole 18 schematically illustrate some of the flow. As mentioned above, the filter box 20, when present, may be constructed of the same materials as the filtration partitions 26, 28, 30, 32, such that the filter box functions to provide another stage of filtration for collecting the debris 40.

The quantity and/or effective surface area of filter boxes 40 may be increased to increase the overall efficiency in trapping the debris 40 before the debris reaches the ECCS strainer 22. This may be beneficial when there is a finite quantity of the debris 40 such that the addition of filter boxes may mean the difference between meeting the overall performance criteria or not. Similarly, there may be more than one of the strainers 22 within the debris trap 10.

Alternatively, in some alternate embodiments, the positions of the debris trap 10 and the combination of the filter box 20 and strainer 22 may be reversed, so that the debris trap is downstream of the filter box 20 and strainer 22. Additionally, in some alternate embodiments (for example, where screening out large debris is not required), the debris trap 10 may optionally be used without the filter box 20 and/or strainer 22. Other variations are also within the scope of this disclosure. For example, each of the disk-shaped filtration partition 26 and tubular filtration partitions 28, 30, 32 may be in a variety of different shapes, such as, for example and not limitation, in the shape of a polygon, a polygon with rounded corners, or any other suitable shape in a top plan view thereof. For example, numerous details of the debris trap 10 may depend upon plant-specific conditions.

As another example, the debris trap 10 may include a lesser or greater number of the filtration partitions 26, 28, 30, 32, and the filtration partitions may be in a variety of different configurations. For example, the inner filtration partition 32 may be omitted and/or the upper filtration partition 26 may be larger so that an additional filtration partition may extend downwardly from the upper filtration partition and around the outer filtration partition 28. In one example where there are filtration partitions arranged in series in a filtration flowpath, the heights of the filtration partitions may decrease in the upstream direction in the filtration flowpath.

Figure 4:
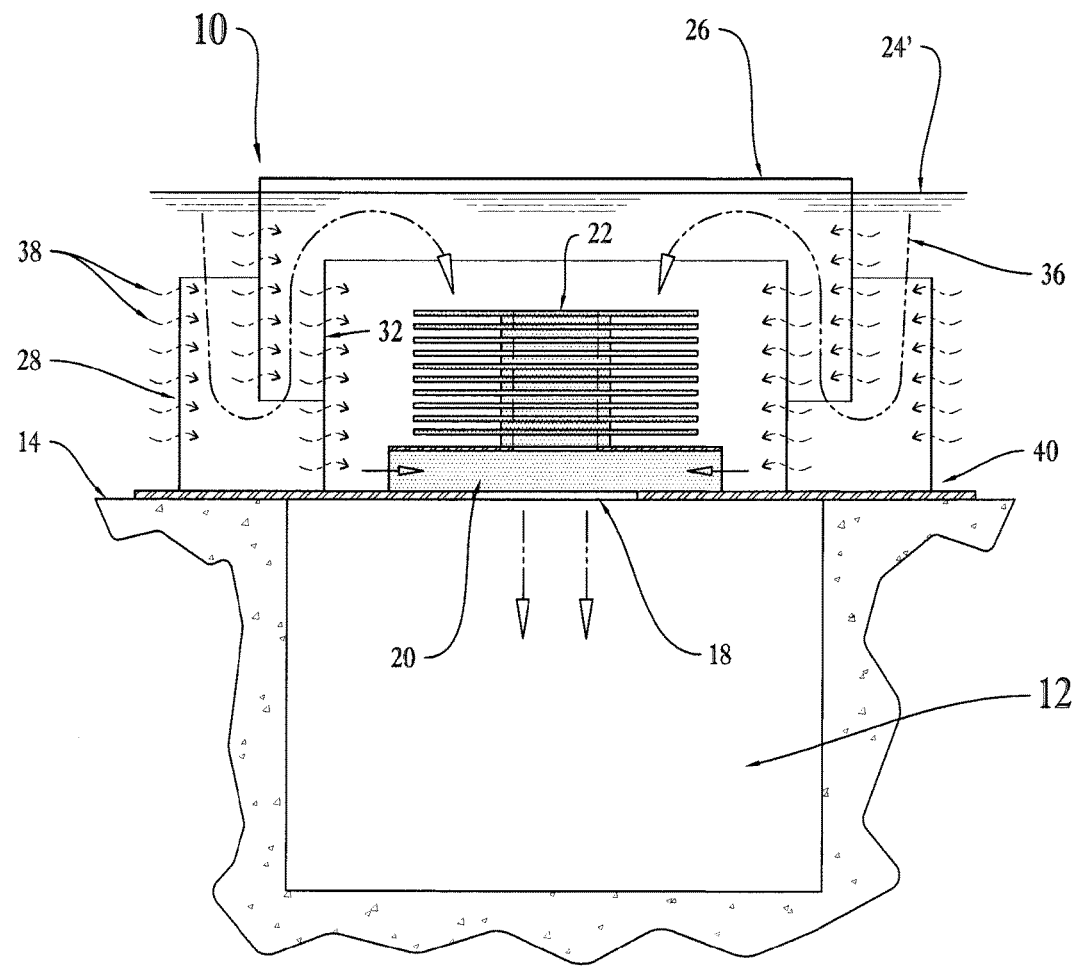
FIG. 4 is like FIG. 1, except for showing a lower level of water.

As another example, the upper filtration partition 26 could be omitted or replaced with a solid metal plate in some possible scenarios. As a more specific example, FIG. 4 is like FIG. 1, except for showing the pool 24' having a lower depth, and with such a sustained lower level of water it may be inconsequential for the upper filtration partition 26 to be omitted or replaced with a solid metal plate. A wide variety of depths of the pools 24, 24' are within the scope of this disclosure. In accordance with one aspect of the first embodiment, it may be preferred for the pools 24, 24' to remain full enough so that the water may flow over the upper ends or edges of the outer and inner filtration partitions 28, 32 in the event that the filtration flowpaths 38 through one or both of the outer and inner filtration partitions are closed off by the debris 40.

Other variations are also with the scope of this disclosure. For example, the debris trap 10 may be characterized as being a module, and a number of the modules may be arranged in series or parallel. As a more specific example, a second embodiment of this disclosure is like the first embodiment, except for variations noted and variations that will be apparent to those of ordinary skill in the art. Due to the similarity, components of the second embodiment that are identical, similar and/or function in at least some ways similarly to corresponding components of the first embodiment have reference numbers incremented by one hundred.

Figure 5:
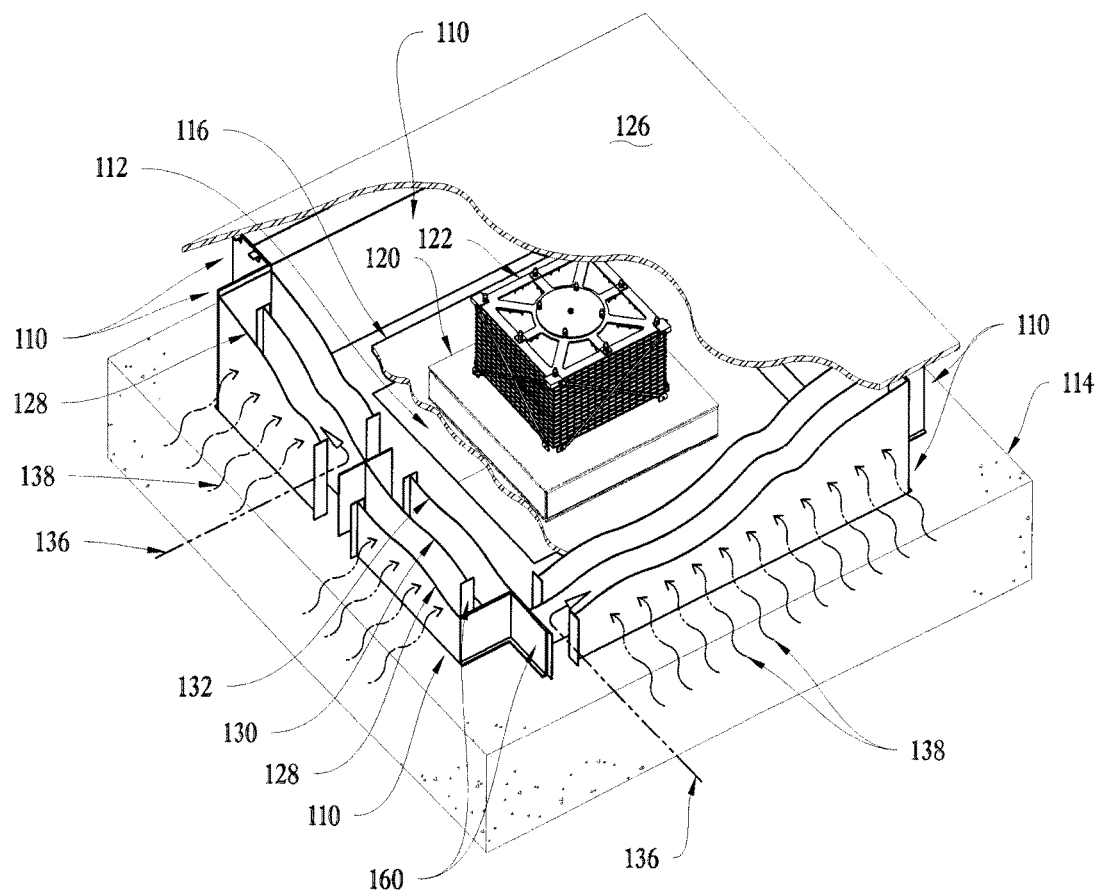
FIG. 5 is a right, top pictorial view of a portion of an ECCS of a nuclear power plant showing a system for separating debris from water in a flowpath of the ECCS, wherein a sump cover is partially cut away, an upper filtration partition for a group of debris traps is partially cut away, and upper portions of several of the debris traps are cut away, in accordance with a second embodiment of this disclosure.
Figure 6:
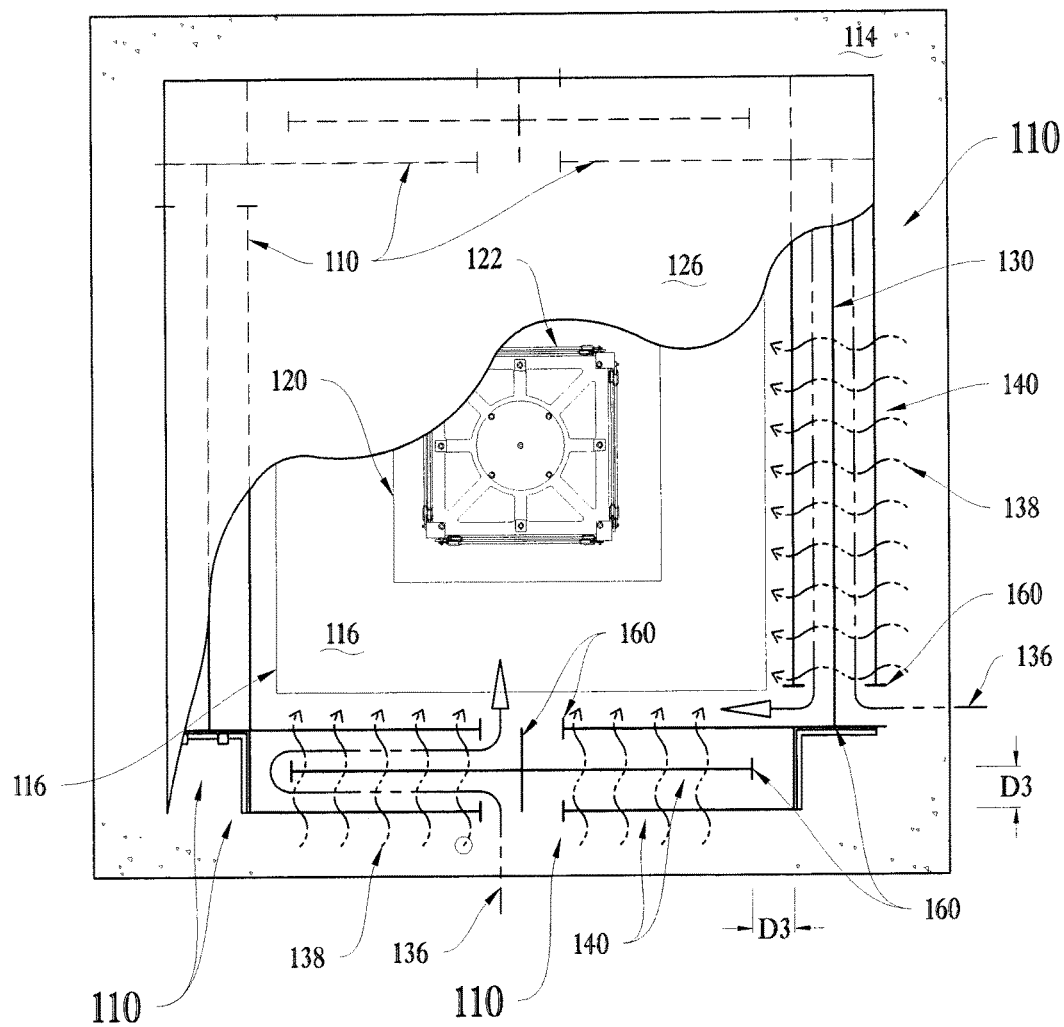
FIG. 6 is similar to FIG. 5, except that it is a top plan view, it shows debris that has been collected by the debris traps, the sump cover is not cut away, and the portions of the debris traps that are hidden from view below the upper filtration partition are schematically illustrated with dashed lines.

A group of debris trap modules 110 of the second embodiment is shown in FIGS. 5 and 6, and discussed in the following. Whereas the bypass flowpath 36 (FIGS. 1 and 4) of the first embodiment has vertical segments that are arranged in series and alternate between upward and downward flow, each of the bypass flowpaths 136 of the second embodiment has horizontal segments that are arranged in series and alternate back and forth. Alternatively, a debris trap or group of debris trap modules could include both of the vertical and horizontal types of bypass flowpaths. As another example, the bypass flowpaths may extend obliquely or be in any other suitable configuration.

The group of debris trap modules 110 extends at least partially around, or substantially around, the filter box 120 and strainer 122 that are above the sump top cover 116 and upstream of the pipe collector or sump chamber 112 defined in and/or below the basement floor 114. As shown in FIGS. 5 and 6, there is a pair of front debris trap modules 110 that are arranged side by side, opposite side debris trap modules that may each extend along the entire length of the group of debris trap modules, and a pair of rear debris trap modules 110 that are arranged side by side. In FIG. 6, the portions of the debris trap modules 110 that are hidden from view (below the portion of the upper filtration partition 126 that is not cut away) are schematically illustrated with dashed lines. In accordance with the second embodiment, all of the debris trap modules 110 share the same upper filtration partition 126, and the single upper filtration partition closes the upper end of a convolute tubular structure that is formed by the group of debris trap modules 110. Alternatively, each of the debris trap modules 110 may be fitted with a separate, dedicated upper filtration partition.

For each of the debris trap modules 110, each of its outer, intermediate and inner filtration partitions 128, 130, 132 is upright and generally planar, or more specifically substantially planar, although each may have corrugations or any other suitable shapes. In accordance with the second embodiment, each of the outer, intermediate and inner filtration partitions 128, 130, 132 has opposite upper and lower ends or edges, and opposite side ends or edges that respectively extend between the upper and lower ends or edges. For each of the outer, intermediate and inner filtration partitions 128, 130, 132, its lower end or edge is in substantially close proximity to the sump cover 116 or floor 114. More specifically, the lower ends or edges of each of the outer, intermediate and inner filtration partitions 128, 130, 132 may be mounted to, or otherwise abut, the sump cover 116 or floor 114. For each of the outer, intermediate and inner filtration partitions 128, 130, 132, its upper end or edge is in substantially close proximity to the upper filtration partition 126. More specifically, the upper ends or edges of each of the outer, intermediate and inner filtration partitions 128, 130, 132 may be mounted to, or otherwise abut, the upper filtration partition 126.

The group of debris trap modules 110 includes upright structural members 160 that each have a lower end or edge that is in substantially close proximity to the sump cover 116 or floor 114. More specifically, the lower ends or edges of each of the structural members 160 may be mounted to, or otherwise abut, the sump cover 116 or floor 114. For each of the structural members 160, its upper end or edge is in substantially close proximity to the upper filtration partition 126. More specifically, the upper ends or edges of each of the structural members 160 may be mounted to, or otherwise abut, the upper filtration partition 126.

For each of the outer, intermediate and inner filtration partitions 128, 130, 132, each of its opposite side ends or edges is in substantially close proximity to a respective structural member 160. More specifically, the opposite side ends or edges of the outer, intermediate and inner filtration partitions 128, 130, 132 may be mounted to, or otherwise abut, the respective structural member 160.

For each of the debris trap modules 110 of the second embodiment, its outer and inner filtration partitions 128, 132 are spaced apart from one another and mounted to opposite ends of the same structural member 160 so that an upwardly and downwardly closed (e.g., substantially closed) and laterally open cavity is defined between the outer and inner filtration partitions. For each of the debris trap modules 110, the intermediate filtration partition 130 is offset/only partially overlapping with respect to the outer and inner filtration partitions 128, 132. More specifically, the intermediate filtration partition 130 extends into the laterally open cavity and protrudes laterally, outwardly from the laterally open cavity.

Referring to the lower right portion of FIG. 6 for example, for each of the debris trap modules 110, each of the outer, intermediate and inner filtration partitions 128, 130, 132 are spaced apart from one another so that a horizontal distance D3 is defined between adjacent ones of the outer, intermediate and inner filtration partitions. Also, for each of the debris trap modules 110, the side ends of the intermediate filtration partition 130 are offset from the side ends of the outer and inner filtration partitions 128, 132 by about the same horizontal distance D3. In the second embodiment, each of the horizontal distances D3 may be about four inches, and the inner filtration partition 132 may be similarly spaced apart from the filter box 120 and strainer 122 by about four inches. Different dimensions are within the scope of this disclosure. For example, the dimensions may depend on the plant-specific conditions.

Similarly to the first embodiment, the bypass flowpath 136 of each debris trap module 110 is an open flowpath that is intended to always remain open. Two of the bypass flowpaths 136 are schematically illustrated in FIG. 6 by a pair of arrows with shanks formed with alternating long and short dashes, and segments of these two bypass flowpaths are schematically illustrated in FIG. 5. Also similarly to the first embodiment, each of the filtration partitions 126, 128, 130, 132 may be characterized as at least partially defining filtration flowpaths 138 of the debris trap modules 110. Some of the filtration flowpaths 138 are schematically illustrated in FIG. 6, and upstream segments of those same filtration flowpaths are schematically illustrated in FIG. 5, by numerous relatively small arrows that each have a curved shank. The segments of the filtration flowpaths respectively extend through the holes in the filtration partitions 126, 128, 130, 132. For example, the upper filtration partition 126 defines generally downwardly extending filtration flowpaths (not shown, but see FIGS. 1 and 4 for example), and the outer, intermediate and inner filtration partitions 128, 130, 132 each define at least segments of generally horizontal, inwardly extending filtration flowpaths 138.

In accordance with the second embodiment, the group of debris trap modules 110 is configured so that, at least initially, each of the bypass and filtration flowpaths 136, 138 is open, and, as compared to one another, the bypass and filtration flowpaths have relatively high and low head loss, respectively. Referring to FIG. 6, as a result of the flow of water through the filtration flowpaths 138, any debris 140 that is in the water and larger than a predetermined size is collected by the outer/upstream surfaces of the filtration partitions 126, 128, 130, 132. The collected debris 140 is schematically illustrated by stippling in FIG. 6. As the filtration partitions 126, 128, 130, 132 continue to collect debris 140, namely more and more relatively small debris over time, the head loss through the filtration flowpaths 138 increases. As a result and over time, the volume of flow through the filtration flowpaths 138 decreases, and the volume of flow through the bypass flowpaths 136 increases. This transition of flow from the filtration flowpaths 138 to the bypass flowpaths 136 typically occurs gradually over time in response to the filtration partitions 126, 128, 130, 132 accumulating more and more debris 140 over time. As with the ECCS example in the first embodiment, over time, an increased portion of the water flows through the bypass flowpaths 136 in a manner that seeks to assure that there is not too much head loss for the ECCS pumps.

Alternatively, in some alternate embodiments, the positions of the group of debris trap modules 110 and the combination of the filter box 120 and strainer 122 may be reversed, so that the group of debris trap modules is downstream of the filter box 120 and strainer 122. Additionally, in some alternate embodiments (for example, where screening out large debris is not required), the group of debris trap modules 110 may optionally be used without the filter box 120 and/or strainer 22. Other variations are also within the scope of this disclosure. For example, numerous details of the debris trap modules 110 may depend upon plant-specific conditions.

In accordance with one aspect of this disclosure, provisions are made for balancing between any addition of flow resistance (or head loss) to an ECCS system and removal of fine debris from the water in the ECCS.

Whereas debris traps of this disclosure have often been discussed in the context of separating debris from water in a flow stream of an ECCS of a nuclear power plant, the debris traps of this disclosure are not limited to such usage and may be put to other uses.

The above examples are in no way intended to limit the scope of the present invention. It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A debris trap for separating debris from water in a flowpath of an Emergency Core Cooling System (ECCS) of a nuclear power plant, the debris trap comprising:
   filtration media for separating at least some of the debris from the water in response to the water flowing through said filtration media;
   a plurality of filtration flowpaths at least partially defined by said filtration media, wherein
      for each filtration flowpath of said plurality of filtration flowpaths, said filtration flowpath extends from upstream of said filtration media to downstream of said filtration media, and
      multiple filtration flowpaths of said plurality of filtration flowpaths extend through both a first portion and a second portion of said filtration media, so that said first portion and said second portion of said filtration media are arranged in series with respect to one another in said filtration flowpath;
   a bypass flowpath at least partially defined by said filtration media, wherein said bypass flowpath extends
      between said first portion and said second portion of said filtration media, and
      along each of said first portion and said second portion of said filtration media; and
   said plurality of filtration flowpaths being configured for at least initially having a lower head loss than said bypass flowpath, and said plurality of filtration flowpaths and said bypass flowpath being in fluid communication with one another, so that the debris trap is operative for automatically, passively decreasing flow through said plurality of filtration flowpaths and increasing flow through said bypass flowpath in response to said filtration media collecting increasing amounts of the debris.

2. The debris trap according to claim 1, wherein said plurality of filtration flowpaths and said bypass flowpath being in fluid communication with one another comprises:

upstream ends of said plurality of filtration flowpaths and said bypass flowpath being in fluid communication with one another; and downstream ends of said plurality of filtration flowpaths and said bypass flowpath being in fluid communication with one another.

3. The debris trap according to claim 2, wherein said plurality of filtration flowpaths and said bypass flowpath being in fluid communication with one another further comprises midstream segments of said plurality of filtration flowpaths and said bypass flowpath being in fluid communication with one another.

4. In combination, the debris trap according to claim 1, and a strainer, wherein the strainer and the debris trap are both positioned in the flowpath of an ECCS, wherein:
said debris trap is in a position selected from the group consisting of
upstream of said strainer in the flowpath of the ECCS, and
downstream of said strainer in the flowpath of the ECCS; and
said debris trap is adapted for at least initially separating relatively small debris from the flowpath, whereas said strainer is adapted for separating relatively large debris from the flowpath.

5. The combination according to claim 4, wherein:
said debris trap is positioned upstream of said strainer in the flowpath of the ECCS; and
said debris trap extends at least partially around said strainer.

6. The combination according to claim 5, wherein said debris trap comprises a plurality of debris trap modules that extends at least partially around said strainer.

7. The debris trap according to claim 1, comprising first and second filtration partitions that are in opposing face-to-face configuration with respect to one another, wherein:
said first filtration partition comprises said first portion of said filtration media; and
said second filtration partition comprises said second portion of said filtration media.

8. A debris trap for separating debris from water in a flowpath of an ECCS of a nuclear power plant, the debris trap comprising:
a plurality of filtration partitions, wherein each filtration partition of said plurality of filtration partitions is configured for separating at least some of the debris from the water in response to the water flowing through said filtration partition, and said plurality of filtration partitions comprises first and second filtration partitions;
a plurality of filtration flowpaths at least partially defined by said plurality of filtration partitions, wherein said plurality of filtration flowpaths extends through both of said first and second filtration partitions, and said first and second filtration partitions are arranged in series in said plurality of filtration flowpaths;
a bypass flowpath at least partially defined by said plurality of filtration partitions, wherein said bypass flowpath extends along each of said first and second filtration partitions; and
said plurality of filtration flowpaths being configured for at least initially having a lower head loss than said bypass flowpath, and said plurality of filtration flowpaths and said bypass flowpath being in fluid communication with one another, so that the debris trap is operative for automatically, passively decreasing flow through said plurality of filtration flowpaths and increasing flow through said bypass flowpath in response to said plurality of filtration partitions collecting increasing amounts of the debris.

9. The debris trap according to claim 8, wherein:
with regard to said plurality of filtration flowpaths, each of said first and second filtration partitions has an upstream side and a downstream side; and
said bypass flowpath extends along each of said upstream and downstream sides of each of said first and second filtration partitions, so that each of said upstream and downstream sides of each of said first and second filtration partitions partially define said bypass flowpath.

10. The debris trap according to claim 8, wherein: each of said first and second filtration partitions includes opposite first and second edges; said first edge of said first filtration partition is closer to said first edge of said second filtration partition than to said second edge of said second filtration partition; said bypass flowpath extends around both said first edge of said first filtration partition and said second edge of said second filtration partition; and the debris trap includes a structure for restricting said bypass flowpath from extending around said second edge of said first filtration partition.

11. The debris trap according to claim 10, wherein:
said second edge of said first filtration partition is selected from the group consisting of a bottom edge of said first filtration partition, a side edge of said first filtration partition, and a top edge of said first filtration partition; and
said structure is selected from the group consisting of a basement floor proximate said second edge of said first filtration partition, an upright structural member proximate said second edge of said first filtration partition; and a top cover proximate said second edge of said first filtration partition.

12. The debris trap according to claim 8, wherein:
said plurality of filtration partitions comprises a third filtration partition;
said first and third filtration partitions are spaced apart from one another and extend away from structure so that said first and third filtration partitions together with said structure at least partially define a cavity; and
said second filtration partition extends into said cavity, is recessed from said structure, and is spaced apart from said first and third filtration partitions so that
an upstream segment of said bypass flowpath is at least partially defined between said first and second filtration partitions,
an intermediate segment of said bypass flowpath is at least partially defined between said second filtration partition and said structure, and
a downstream segment of said bypass flowpath is at least partially defined between said second and third filtration partitions.

13. A debris trap for separating debris from water in a flowpath of an ECCS of a nuclear power plant, the debris trap comprising:
a plurality of filtration partitions, wherein each filtration partition of said plurality of filtration partitions is configured for separating at least some of the debris from the water in response to the water flowing through said filtration partition, and said plurality of filtration partitions comprises first, second and third filtration partitions;
a plurality of filtration flowpaths at least partially defined by said plurality of filtration partitions, wherein said plurality of filtration flowpaths extends through each of said first, second and third filtration partitions, and said first and second filtration partitions are arranged in series in said plurality of filtration flowpaths;
a bypass flowpath at least partially defined by said plurality of filtration partitions, wherein said first and third filtration partitions are spaced apart from one another and extend away from a structure so that said first and third filtration partitions together with said structure at least partially define a cavity, and wherein said second filtration partition extends into said cavity, is recessed from said structure, and is spaced apart from said first and third filtration partitions so that an upstream segment of said bypass flowpath is at least partially defined between said first and second filtration partitions,
an intermediate segment of said bypass flowpath is at least partially defined between said second filtration partition and said structure, and
a downstream segment of said bypass flowpath is at least partially defined between said second and third filtration partitions.

14. The debris trap according to claim 13, wherein said first, second and third filtration partitions are substantially parallel to one another.

15. The debris trap according to claim 13, wherein:
each of said first, second and third filtration partitions is substantially cylindrical;
said first filtration partition extends at least partially around said second filtration partition; and
said second filtration partition extends at least partially around said third filtration partition.

16. The debris trap according to claim 15, wherein said first, second and third filtration partitions are substantially concentric with respect to one another.

17. The debris trap according to claim 13, wherein:
each of said first, second and third filtration partitions is substantially rectangular in top plan view;
said first filtration partition extends at least partially around said second filtration partition;
said second filtration partition extends at least partially around said third filtration partition; and
said first, second and third filtration partitions are substantially concentric with respect to one another.

* * * * *